United States Patent [19]

Kiser

[11] Patent Number: 5,376,045
[45] Date of Patent: Dec. 27, 1994

[54] TWIN BLOWER AIRHOUSE

[75] Inventor: Thomas E. Kiser, Fremont, Ohio

[73] Assignee: Professional Supply, Inc., Fremont, Ohio

[21] Appl. No.: 148,833

[22] Filed: Nov. 5, 1993

Related U.S. Application Data

[63] Continuation-in-part of Ser. No. 665,352, Mar. 6, 1991, Pat. No. 5,290,200, and a continuation-in-part of Ser. No. 938,759, Sep. 1, 1992, Pat. No. 5,290,188, and a continuation-in-part of Ser. No. 972,572, Nov. 6, 1992, Pat. No. 5,289,696.

[51] Int. Cl.$^5$ .............................................. F24F 3/06
[52] U.S. Cl. .......................... 454/229; 126/110 AA; 454/234; 454/236
[58] Field of Search ............. 126/103, 110 AA, 116 R; 454/229, 234, 235, 236, 265, 269, 324, 334, 338

[56] References Cited

U.S. PATENT DOCUMENTS

| | | | |
|---|---|---|---|
| 3,404,618 | 10/1968 | Jacobs | 454/236 |
| 3,748,997 | 7/1973 | Dean, Jr. et al. | 454/236 X |
| 3,960,527 | 6/1976 | Goettl | 454/236 X |
| 4,570,532 | 2/1986 | LaBelle | 454/234 |
| 4,759,196 | 7/1988 | Davis | 454/236 X |

FOREIGN PATENT DOCUMENTS 754790  8/1956  United Kingdom ............... 454/236

Primary Examiner—Harold Joyce
Attorney, Agent, or Firm—Marshall & Melhorn

[57] ABSTRACT

An airhouse for supplying conditioned air to the interior of an enclosed building. Matched twin blowers symmetrically arranged within the airhouse enclosure are operated in unison to insure a balanced air flow into the airhouse and through the blowers. A burner unit mounted intermediate the blowers is flanked by matching outside air inlets having controllable dampers, preferably of a canister-type, operable in opposition. A building return air inlet located midway between the blowers likewise has canister-type dampers operable in opposition. The blowers may be independent and operated at the same speed by separate drive means, or they may be mounted on a common shaft operated by a single drive means. A controller may be provided for varying the speed of the drive means. In one embodiment dampers may be provided for the building air outlets along with dampered openings from the blower enclosures to the external atmosphere for rapidly expelling contaminated air from the building interior.

18 Claims, 3 Drawing Sheets

TWIN BLOWER AIRHOUSE

This application is a continuation-in-part of applications Ser. No. 07/665,352, filed Mar. 6, 1991, now U.S. Pat. No. 5,290,200 and a continuation-in-part of Ser. No. 07/938,759, filed Sep. 1, 1992 now U.S. Pat. No. 5,290,188 and a continuation-in-part of and Ser. No. 07/972,572, filed Nov. 6, 1992.

BACKGROUND OF THE INVENTION

1. Field of the Invention

The present invention pertains broadly to airhouses for supplying conditioned air to the interior of an enclosed building, and more particularly to an improved airhouse compatible with existing systems and having reduced initial cost and increased operating efficiency.

2. Description of the Prior Art

In a system developed in recent years for maintaining desired atmospheric conditions throughout large industrial-type buildings, the building interior is substantially isolated or enclosed and conditioned air, including sufficient outside air, is continuously admitted through air handling units, or airhouses, located about the building to maintain the interior of the building under a slight positive pressure throughout, slightly greater than the effective outside atmospheric pressure are around the building. Various aspects of such a system described, by way of example, in U.S. Pat. Nos. 4,850,264, 4,960,041 and 5,146,977, as well as the above identified copending U.S. patent applications. As discussed at length therein, sensors strategically located throughout the building monitor various atmospheric conditions such as relative interior and exterior atmospheric pressures, temperature, humidity, pollutants of and particulate levels, and transmit signals indicative the readings to a central computer. The computer periodically monitors the signals and compares them to stored data representing desired parameters for the atmospheric conditions in the various zones monitored by the sensors. The controllable airhouses strategically located about the building, generally on the roof, are individually regulated in response to signals from the central computer to collectively take corrective measures when a trend for an atmospheric condition in a particular area to fall outside the predetermined parameter is detected.

Airhouses used heretofore in such systems have generally included a sheet metal cabinet housing a heat source, typically a direct-fired gas burner or steam coil, a fan or blower unit, and a system of dampers for regulating admission of air to and discharge of air from the airhouse. The airhouse might also include evaporative humidification equipment. Such airhouses perform well for their intended purpose. However, they have certain limitations which the present invention overcomes. Thus, the blower of the airhouse has limited capacity so that in order to provide the required volume of air for operating the system, a relatively large number of airhouses is required.

The airhouses are generally installed on the roof of the structure, and installation of each unit requires substantial modification to the roof structure, so that multiplication of the units adds to the overall cost. In addition, the prior art units have a fixed capacity, that is, the blower units operate at a constant velocity to output a constant volume of air. The proportion of outside and building return air is modulated by operating dampers in the outside air and building return air inlets in opposition. In order to provide a straight line variation in damper flow capacity, so that the combined flow of the dampers remains constant, the prior art dampers require a significant area in the airhouse.

SUMMARY OF THE INVENTION

In accordance with the present invention there is provided an improved airhouse having greater air handling capacity than conventional airhouses, thereby reducing the number of such airhouses required for a facility. Matched twin blowers are symmetrically arranged within the airhouse and operated in unison to insure a balanced air flow into the airhouse and through the two blowers. In a preferred embodiment a burner unit mounted intermediate the blowers is flanked by opposed matching outside air inlet dampers. The dampers may be of a roll-up canister construction whereby the open portion of the inlet opening is unobstructed so that the dimensions of the damper opening are minimized. A building return air inlet having adjustable dampers is also provided. The outside air and building return air dampers are operated in opposed fashion so that the combined flow of air entering the airhouse remains uniform. In one embodiment the twin blowers are driven at the same speed by separate motors, while in an alternate embodiment the blowers are mounted upon a common shaft driven by a single motor. Provision may be made for operating the motor or motors at varying speeds to coordinate the output of the airhouse with required air volume under differing operating conditions so as to minimize operating costs. Heat exchangers may typically be provided within the airhouse for heating or cooling the incoming air, and evaporative humidification units may be included for humidifying the air prior to admission to the building interior. An additional outlet may be provided for each blower unit whereby air withdrawn from the building interior may be selectively vented directly to the outside.

It is, therefore, a primary object of the invention to provide an airhouse construction with increased air flow capacity.

Another object of the invention is to provide an airhouse construction wherein the number of airhouses required for maintaining atmospheric conditions within a particular building is minimized.

Another object of the invention is to provide an airhouse construction which is less costly to install upon a building.

Still another object is to provide an airhouse having adjustable air flow output for minimizing operating energy requirements.

Yet another object of the invention is to provide an airhouse incorporating adjustable dampers providing linear variation in air flow between fully open and fully closed positions, and capable of utilizing the entire area of the damper opening.

Other objects and advantages of the invention will become apparent during the course of the following description, when taken in connection with the accompanying drawings.

BRIEF DESCRIPTION OF THE DRAWINGS

In the drawings, wherein like numerals refer to like parts throughout.

DESCRIPTION OF THE PREFERRED EMBODIMENTS

Figures 1, 3:
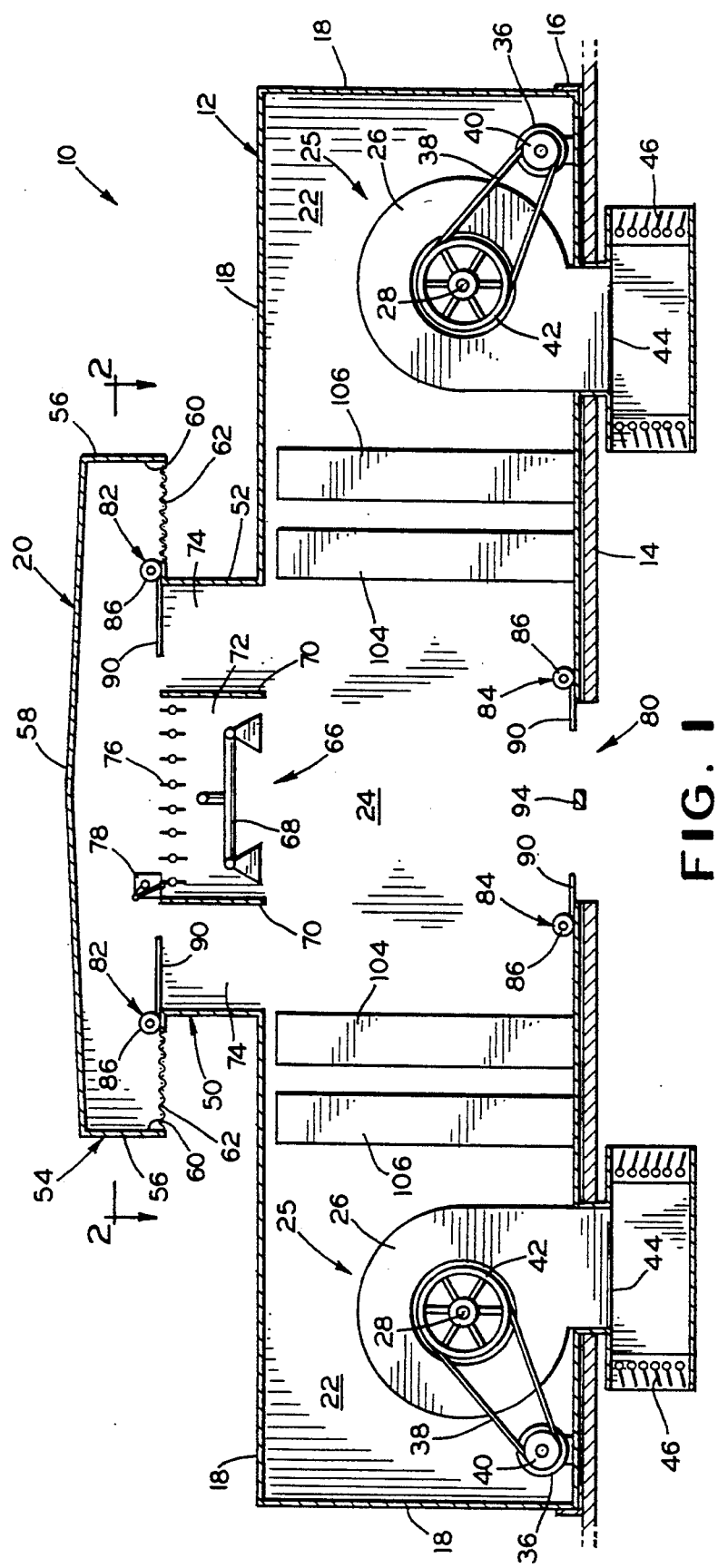
FIG. 1 is a longitudinal vertical section schematically illustrating an airhouse embodying the invention.
FIG. 3 is a vertical section illustrating an alternate embodiment of the outside air inlet section of the airhouse.

With reference now to the drawings, and particularly to FIG. 1, there is shown generally at 10 an air handling unit or airhouse embodying the invention. More particularly, the airhouse comprises a box-like structure 12 of generally rectangular configuration mounted as on the suitably supported roof 14 of a building (not shown) in a conventional manner. The structure 12 may conventionally comprise a skeletal framework (not shown) carried upon a roof curb or base 16 of structural angle members, enclosed by panels 18. An inlet section 20 of generally T-shaped cross section sits atop the structure 12.

The airhouse is designed to condition and deliver outside air and/or recirculated indoor air at a high volume into the building interior and to modulate the proportions of the two so as to deliver a composite flow at the desired condition and with a volume of outside air sufficient to maintain the desired pressurization within the building. To that end the airhouse includes, on either side of the inlet section 20, a blower section 22. In order to balance the air flow into and through the unit, and in particular through and along the burner unit as will be hereinafter described, the blower sections are symmetrical and of generally identical construction and capacity.

The blower sections are in communication with a central chamber 24 within the airhouse. There is located within each blower section a blower unit 25 including a scroll housing 26 within which an impeller (not shown) is mounted for rotation on a shaft 28 suitably journalled at its opposite ends. A motor 36 is drivingly coupled to the impeller by means of a belt 38 entrained about a pulley 40 of the motor and a sheave 42 on the shaft 28. By way of example, the blower units 25 may each be of 100,000 cubic feet per minute capacity. Air is discharged from the scroll housing 26 through an outlet 44 and corresponding opening in the roof 14, and through a suitable directional diffusing unit 46 into the interior of the building.

While the invention has been illustrated and described as employing a blower of scroll-type construction, it will be readily understood that other and different fan constructions may be employed as well. For example, for some installations conventional impeller and shroud fan units commonly employed in the field and as will be hereinafter described, may be incorporated in the blower sections 22. It is essential that the blowers or fans of the two blower sections, regardless of their type, be of matched performance, that is, that they create generally identical flow characteristics through the airhouse.

As indicated above the inlet section 20 is generally T-shaped in cross section and includes a base section 50 opening into the chamber 24 and defined by opposite side walls 52 and end walls (not shown). A cap section 54 defined by opposite side walls 56, a cover 58 and opposite end walls 60 extends laterally beyond the walls 52 so as to define between the walls 52 and 56, elongated inlet openings 62 through which outside air is drawn by the blower units. Screens 64 may be provided over the inlet openings to exclude animals and debris.

Figure 2:
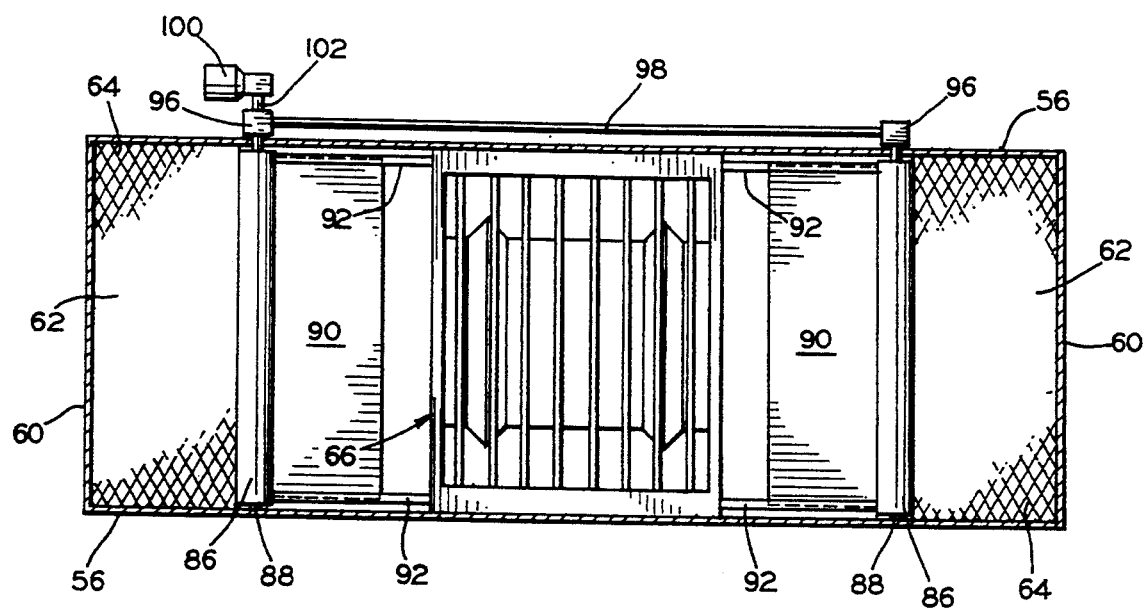
FIG. 2 is a top plan view, taken substantially along line 2—2 of FIG. 1, of the inlet section for the airhouse.
Figure 6:
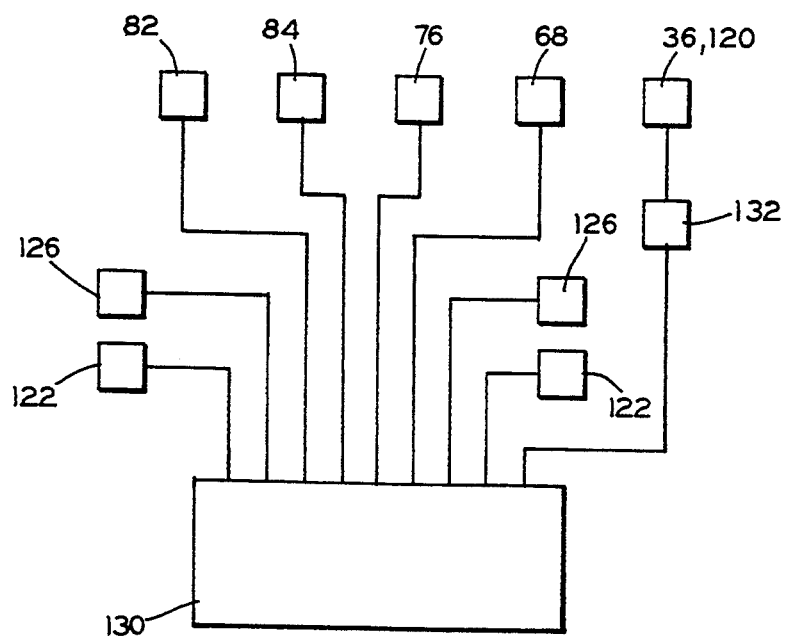
FIG. 6 is a diagram schematically illustrating a control system for the invention.

In one embodiment as illustrated in FIGS. 1 and 2, there is mounted intermediate the side walls 52 of the base 50, in the throat of the inlet section 20, a burner assembly identified generally at 66. A conventional gas fired burner 68 is mounted intermediate spaced partition walls 70 extending across the inlet section 20 and defining a burner chamber 72. The burner 68 is connected to a suitably regulated fuel supply in the usual fashion. The partition walls 70 and adjacent side walls 52 define therebetween outside air inlet passages 74, the passages 74 being of equal width and length so as to present identical profiles for air flow purposes. A damper 76 is provided at the entrance to the burner chamber 72. The damper may suitably be a so-called parallel blade louver type as shown in FIGS. 1 and 2.

As described in the aforementioned patents, the burner assembly is designed so that the burner chamber has a predetermined specific area relationship to the combined areas of the inlet passages 74, typically an 80/20 or 70/30 inlet-area-to-burner-chamber-area relationship. In operation, the burner damper 76 must be in the fully open position for the burner 68 to be operable. At such times as the burner is not operated, the damper is closed to close off the burner chamber 72. To that end a motorized drive unit 78 is operably connected to the damper 76 for selectively moving it between the opened and closed positions. As illustrated in FIG. 1 the damper is in the open, burner-operating position.

As heretofore indicated, the airhouse is adapted to supply a combination of outside air and building return air in selected proportions through the outlets 44 and diffusing units 46 to the interior of the building. Depending upon the need for heated air to maintain the temperature within the building at the desired temperature, a portion of the incoming outside air may be drawn through the burner assembly 66. A building return air inlet 80 is provided in the lower wall or floor of the airhouse for admitting return air from the building interior to the central chamber 24. In order for the modulated flow of combined outside air and building return air to remain constant as the proportions are varied in response to building demand, the area of the return air inlet 80 is equal to the combined area of the two outside air inlet passages 74.

Dampers are provided for regulating the air flow through the inlet passages 74 and the return air inlet 80 and for appropriately apportioning the flow between the outside air and the return air. Various types of dampers have been employed heretofore for that purpose, and while those dampers have been suitable for their intended purpose they have been found to have certain limitations for the purposes of the present invention. Thus, louvered dampers of the so-called parallel blade and opposed blade types provide large flow capacity in their fully open positions for a given damper area. However, they do not provide a uniform variation in air flow capacity as they are adjusted, so that they do not provide a uniform combined flow through the outside air and return air inlets as desired. More recently employed slide dampers, on the other hand, perform very well in providing uniform variation in air flow capacity as they are adjusted. However, their overlapping sliding elements generally dictate that a maximum of one half of the damper area is available for air flow in the fully open position. Thus, the damper area must be relatively large to provide the needed flow capacity. The dual blower system of the present invention requires that air flow through the two outside air inlets 74 be equal at all times, and that the air flow vary in a linear or straight line manner as the dampers in the outside air inlets 74 and the return air inlet 80 are adjusted in opposition.

In order to overcome the above-noted limitations of the prior art devices, dampers 82 and 84 of a canister or roll-up type are preferably provided for the inlet passages 74 and the return air inlet 80, respectively. The dampers are of similar construction and as best seen in FIGS. 1 and 2, may comprise a cylindrical sheath or canister 86 extending across the inlet opening and having a suitable reeling or winding means therewithin such as a drum (not shown) mounted for rotation upon a shaft 88. A damper element 90 is mounted so as to be selectively extended from and retracted into the canister 86 by manipulation of the reeling means and shaft 88. By way of example, the damper element 90 may be a suitable flexible metal or plastic sheet material, or it may comprise hinged or interlocking transversely extending strips as conventionally employed in roll-up type overhead doors.

The opposite longitudinal edges of the damper elements of the damper 82 are slidably received in channel members 92 (FIG. 2) extending across the ends of the inlet passages 74. In order to provide balanced flow to the two blower sections 22, two of the dampers 84 are employed in the return air inlet 80. The dampers are positioned along the edges of the inlet opening, with the damper elements 90 operating in opposed fashion and converging toward an intermediate divider bar 94 extending across the inlet. As will be hereinafter explained, the dampers 84 operate in unison so that the openings on either side of the divider bar 94 remain equal to insure balanced air flow to the two blower sections.

The dampers 82 are operatively interconnected for simultaneous opposed adjustment to maintain equal damper openings in the two inlet passages 74. The dampers 84 are likewise operatively interconnected for simultaneous opposed adjustment to maintain equal damper openings on either side of the divider bar 94 within the return air inlet 80. The pairs of dampers 82 and 84 are operatively interconnected as by a central programmable controller to operate in opposition so as to maintain the combined area of the damper openings, and hence the volume of air drawn into the central chamber 24, uniform as the proportions of outside air and building return air are varied in response to building requirements.

As will be seen in FIG. 2, for purposes of operation each of the shafts 88 of the dampers 82 and 84 may be coupled to a right angle gear box 96. The gear boxes are operatively interconnected by a drive shaft 98. A reversible gear reduction drive unit 100 is operatively connected by an output shaft 102 to one of the gear boxes 96 for rotating the associated shaft 88 to extend or retract the damper element 90. The drive shaft 98 simultaneously drives the other gear box 96, which is configured to extend or retract its associated damper element 90 in opposition to the first damper element. As will be readily apparent, other and different means may be employed for operatively interconnecting the pairs of dampers. For example, a chain and sprocket arrangement may be substituted for the right angle gear boxes and drive shaft, or separate electronically controlled drive units might be employed.

In order to thermally condition the air or to add moister for humidification purposes prior to admission to the building interior at such times as may be desirable, conventional heat exchangers and/or humidifying means may be provided within the airhouse. Accordingly, either or both thermal heat exchangers 104 and evaporative humidification units 106 of conventional construction may optionally be positioned in the flow paths of the air through the airhouse as shown in FIG. 1.

In some instances it may not be feasible to employ open fired gas burners as the source of heat for the airhouse. In such situations heat may be provided as by the thermal heat exchangers 104 which may, for example, comprise steam coils. In that event the inlet section 20 is modified as illustrated in FIG. 3 to omit the burner assembly 66. The throat of the inlet section may be narrowed so that the area of the inlet passage in the inlet section is equivalent to the area of the building return air inlet 80. Dampers 84 and an intermediate divider bar 94 similar to those at the return air inlet are provided for the inlet section.

Figure 4:
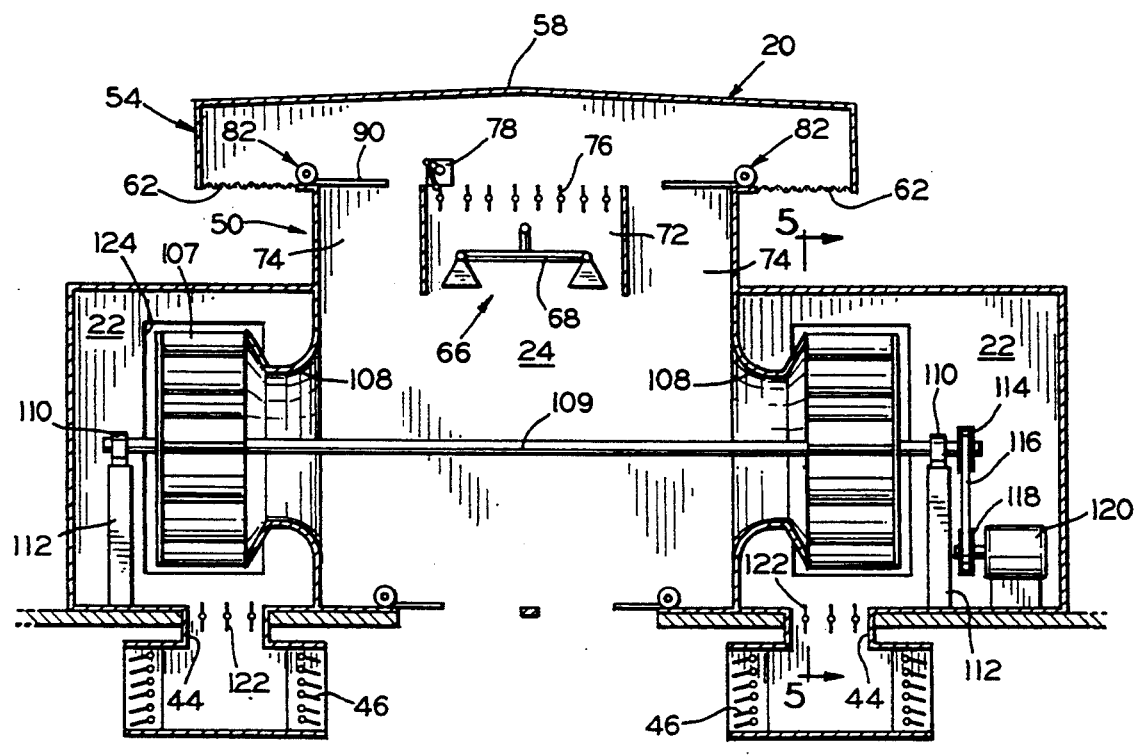
FIG. 4 is a longitudinal vertical section similar to FIG. 1, illustrating an alternate embodiment of the invention.

There is shown in FIG. 4 an alternate embodiment of the invention wherein there is located within each blower section 22 a blower unit including an impeller unit 107 and an associated shroud 108. The impellers 107 of the two blower sections are mounted upon a common shaft 109. The shaft is journalled for rotation in bearings 110 carried by pedestals 112 mounted as within the opposite blower sections 22. There is affixed to an extended portion of the shaft 109 a pulley 114 drivingly coupled by a belt 116 to the output pulley 118 of a suitably controlled motor 120. The impellers 107 are suitably configured to draw air from the central chamber 24 into the oppositely disposed blowers mounted upon the common shaft 108. The two blowers are thus driven by the single motor 120 to assure equal impeller speed and balanced air flow through the two blower sections 22.

It is, of course, fully contemplated that some existing airhouses of conventional construction may be modified and retrofitted to incorporate the twin blower concept of the present invention.

Figure 5:
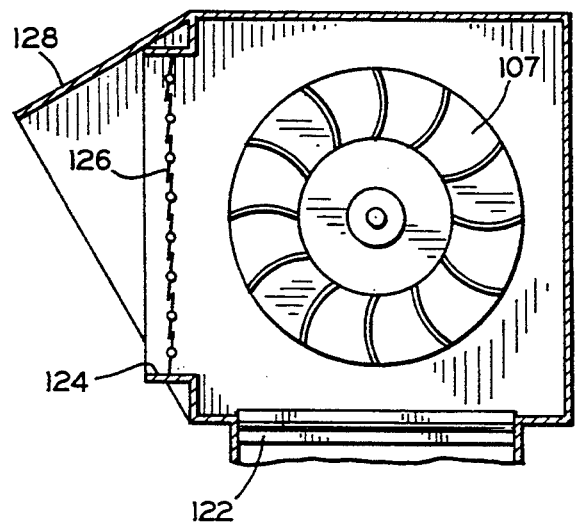
FIG. 5 is an end view taken substantially along line 5—5 of FIG. 4.

The twin blower airhouse of the present invention, due to its capacity for handling large volumes of air in a localized area, is also particularly well suited to rapidly evacuating air from a localized area of the building interior to the outside atmosphere. To that end in accordance with the invention, as illustrated in FIGS. 4 and 5, the outlet openings 44 from the blower sections 22 may be provided with suitable dampers 122 moveable between fully open and fully closed positions. Since the damper will be operated in either the fully open or the fully closed position, it may suitably be of a conventionally controlled louver type. There is additionally provided in a side wall of the blower section 22 an outlet passage 124 opening to the external atmosphere. A damper 126, which again may be of the louver type movable between fully open and fully closed positions, is provided in the outlet passage. A hood 128 (FIG. 5) may be conventionally provided over the outlet passage and damper to protect against entry of rain and snow.

During normal operations, the dampers 122 will be in the fully open position and the dampers 126 will be in the fully closed position so that air may be drawn into the central chamber 24 through the burner chamber 72, inlet passages 74, and return air inlet 80 as appropriate, and directed through the outlets 46 to the building interior. However, if a buildup of contaminated air is noted in the vicinity of the airhouse by the control mechanism and it is deemed advisable to exhaust the air to the outside, a sequence of events is initiated by the control mechanism whereby the burner 68 is shut down, the dampers 76 and 82 are completely closed, the dampers 84 and 126 are fully opened, and the dampers 122 are fully closed. The airhouse then rapidly extracts contaminated air from the building interior through the return air inlet 80 and exhausts it to the outside atmosphere through the outlet passage 124.

A sufficient number of the airhouses is utilized to provide the capacity necessary for supplying conditioned air to the building interior during periods of maximum demand, for example during the winter heating season. With conventional constant-volume, constant-blower-speed airhouses, sufficient air can be provided to maintain the desired building pressurization during certain periods, as during the non-heating season, using primarily building return air with a minimum of outside makeup air being drawn in through the outside air inlets. However, the power demand for operating the airhouse blowers remains constant. With the high capacity of the twin blower airhouse of the present invention, it is possible to design the airhouse with variable capacity so as to reduce the volume of air handled during times of off peak demand, while still providing the high volume of air required during peak demand periods. Thus, the motor or motors on the blowers are provided with conventional variable speed controls so that the speed of the blowers can be adjusted in response to the demand for air volume. The desired level of building pressurization can then be maintained using primarily outside air mixed with a minimum of building return air. The resulting reduction in energy required for operating the blowers represents a very significant saving in the cost of operation.

There is shown in FIG. 5 a diagram schematically illustrating a control system for the novel airhouse. Thus, a plurality of the airhouses 10 may be suitably linked to a central programmable computer 130 for integrated operation as described in the aforementioned patents. The blower motors 36 or 120 are suitably operably connected, either directly or through a conventional variable speed controller 132, to the computer 130. The burner 68 and the burner damper 76, as well as the dampers 82, 84, 122 and 126 are likewise operably coupled to the computer for integrated operation in the aforedescribed manner.

It is to be understood that the forms of the invention herewith shown and described are to be taken as illustrative embodiments only of the same, and that various changes in the shape, size and arrangement of parts, as well as various procedural changes, may be resorted to without departing from the spirit of the invention.

What is claimed is:

1. An airhouse for supplying outside air and building return air in controlled amounts to the interior of an enclosed building, comprising an enclosure, a first blower section at one end of the enclosure, a second blower section at the other end of the enclosure, a central chamber intermediate the blower sections and in communication with the first and second blower sections, outside air inlet means for admitting outside air in controlled amounts to the central chamber, building return air inlet means for admitting return air from the building interior to the central chamber in controlled amounts, an outlet from each said blower section to the interior of the building, and matched blower means in said first and second blower sections for drawing air into the central chamber through the outside air inlet means and the return air inlet means and discharging air from said first and second blower sections in substantially equal amounts to the building interior.

2. An airhouse for supplying outside air and building return air to the interior of an enclosed building as claimed in claim 1, wherein said outside air inlet means comprises an inlet section atop said enclosure intermediate said matched blower means, said inlet section including a throat section through which said outside air is drawn into said central chamber, and first adjustable damper means operable to admit air through said throat to each one of said matched blower means in equal volumes.

3. An airhouse for supplying outside air and building return air to the interior of an enclosed building as claimed in claim 2, wherein said adjustable damper means comprises a pair of damper elements adapted for selective simultaneous extension and retraction across said throat in opposed directions for regulating air flow through said throat.

4. An airhouse for supplying outside air and building return air to the interior of an enclosed building as claimed in claim 3, including second adjustable damper means for said building return air inlet means, said second damper means being adapted to admit air in substantially equal volumes to said matched blower means in said first and second blower sections, and said second damper means being adjustable in opposition to said first damper means whereby a constant volume of composite outside air and building return air is drawn into said central chamber by said matched blower means.

5. An airhouse for supplying outside air and building return air to the interior of an enclosed building as claimed in claim 4, wherein said second adjustable damper means comprises a second pair of damper elements adapted for selective simultaneous extension and retraction across said building return air inlet in opposed directions for regulating air flow through said return air inlet.

6. An airhouse for supplying outside air and building return air to the interior of an enclosed building as claimed in claim 2, including heat exchange means disposed in the path of air drawn through said central chamber into each of said first and second blower sections by said matched blower means.

7. An airhouse for supplying outside air and building return air to the interior of an enclosed building as claimed in claim 6, wherein said heat exchange means comprises means for heating the air.

8. An airhouse for supplying outside air and building return air to the interior of an enclosed building as claimed in claim 6, wherein said heat exchange means comprises means for cooling the air.

9. An airhouse for supplying outside air and building return air to the interior of an enclosed building as claimed in claim 2, including evaporative humidification means disposed in the path of air drawn through said central chamber into each of said first and second blower sections by said matched blower means.

10. An airhouse for supplying outside air and building return air to the interior of an enclosed building as claimed in claim 2, including a burner unit disposed centrally within said throat section so as to define inlet air passages of equal dimensions on either side of said burner unit within said throat section.

11. An airhouse for supplying outside air and building return air to the interior of an enclosed building as claimed in claim 10, wherein said first adjustable damper means comprises a damper element for each said inlet air passage, the damper elements being adapted for selective extension and retraction across their respective inlet air passages in unison in opposed directions to maintain equal and symmetrical air flow through the inlet air passages along either side of the burner unit.

12. An airhouse for supplying outside air and building return air to the interior of an enclosed building as claimed in claim 11, including means for unwinding and winding said damper elements for selectively linearly extending and retracting said damper elements across said inlet air passages.

13. An airhouse for supplying outside air and building return air to the interior of an enclosed building as claimed in claim 2, wherein each said blower means comprises a scroll housing, said scroll housing having an outlet in communication with said outlet from said blower section to the interior of the building, an impeller mounted for rotation within said scroll housing, and drive means for rotatably driving said impeller to draw air into said housing from said central chamber and discharge said air into the building interior.

14. An airhouse for supplying outside air and building return air to the interior of an enclosed building as claimed in claim 13, including means coordinating operation of the drive means for the separate blower means to drive the blower means at substantially equal speeds.

15. An airhouse for supplying outside air and building return air to the interior of an enclosed building as claimed in claim 14, including speed control means for operating said drive means at selected speeds to draw predetermined selected volumes of air through each said blower means.

16. An airhouse for supplying outside air and building return air to the interior of an enclosed building as claimed in claim 1, wherein each said blower means comprises an impeller wheel rotatably mounted within said blower section, a shroud associated with each said impeller wheel for directing air from said central chamber into the impeller wheel, and drive means for driving the impeller wheels in the first and second blower sections at substantially equal speeds.

17. An airhouse for supplying outside air and building return air to the interior of an enclosed building as claimed in claim 16, wherein the impeller wheels in the first and second blower sections are rotatably mounted upon a common shaft, and said drive means comprises a motor drivingly coupled to said shaft.

18. An airhouse for supplying outside air and building return air to the interior of an enclosed building as claimed in claim 16, including damper means in the outlet from each said blower section to the building interior selectively movable between open and closed positions, an outlet passage in each blower section opening to the outside atmosphere, and damper means in each said outlet passage selectively movable between open and closed positions.

* * * * *